H. T. MYERS.
COMBINED BUMPER AND FENDER.
APPLICATION FILED FEB. 21, 1910.
1,026,279.
Patented May 14, 1912.
4 SHEETS—SHEET 1.
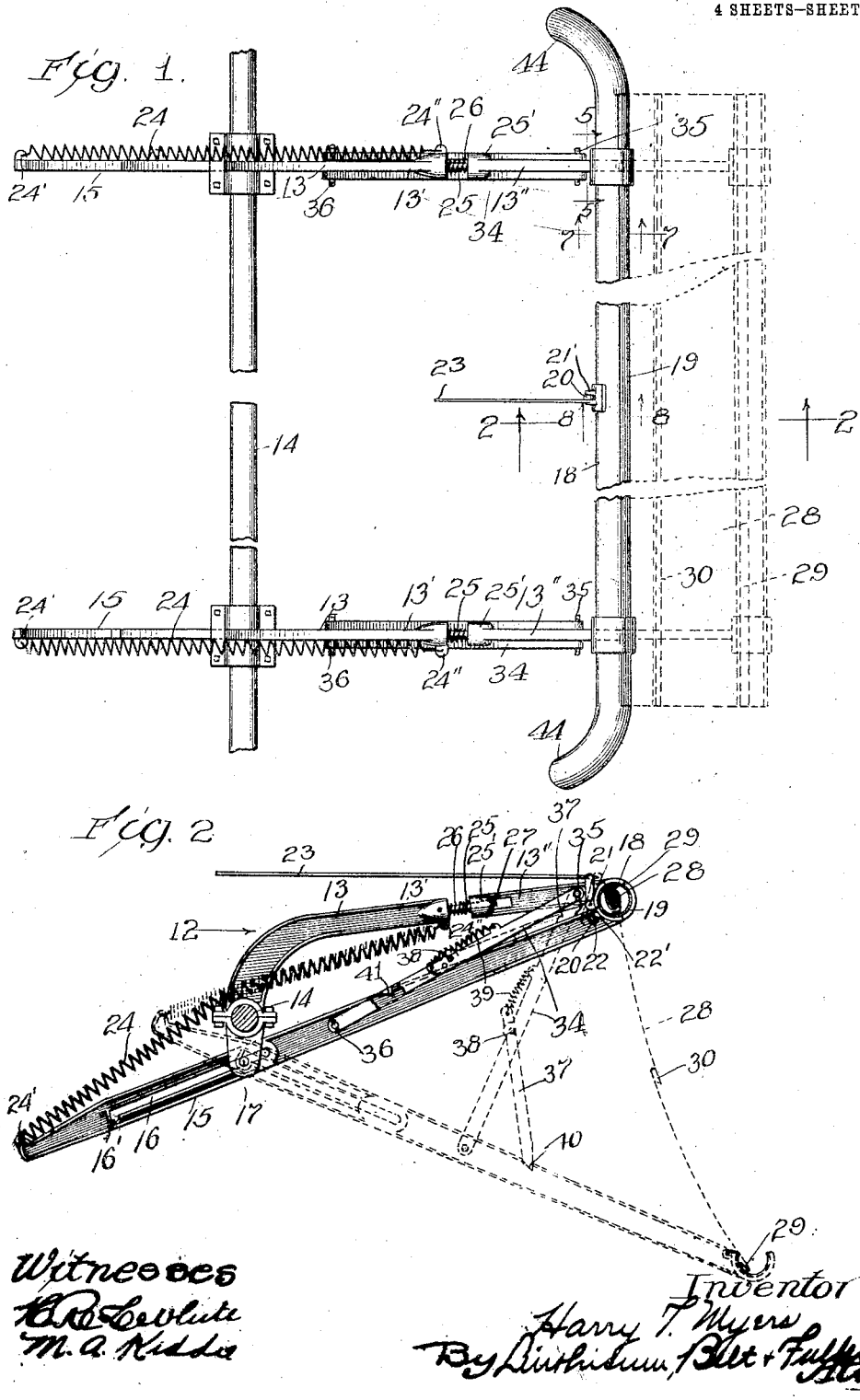

H. T. MYERS.
COMBINED BUMPER AND FENDER.
APPLICATION FILED FEB. 21, 1910.
1,026,279.
Patented May 14, 1912.
4 SHEETS—SHEET 2.
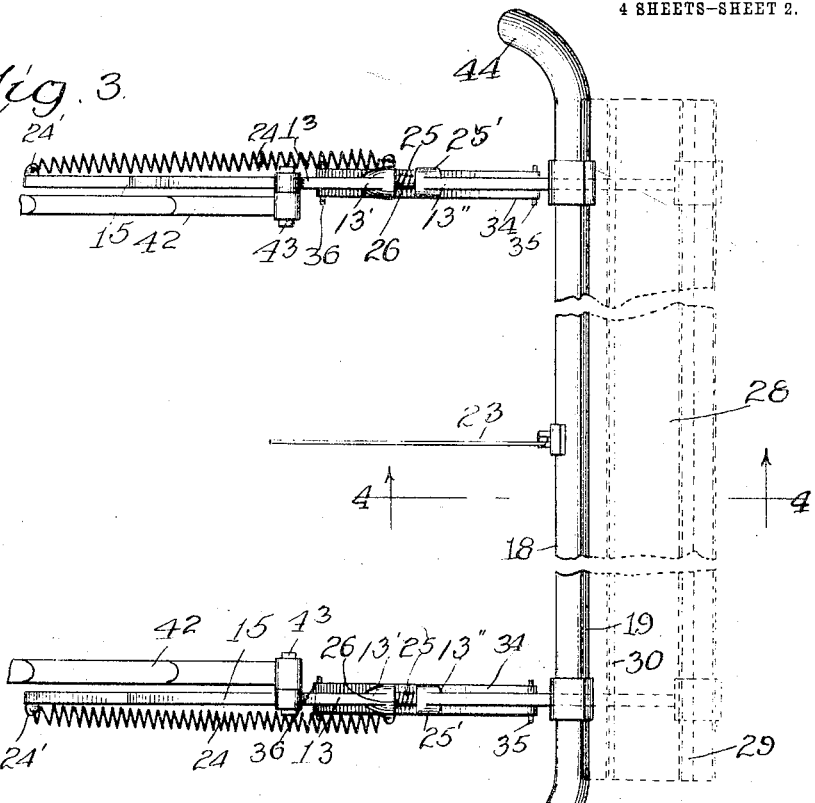
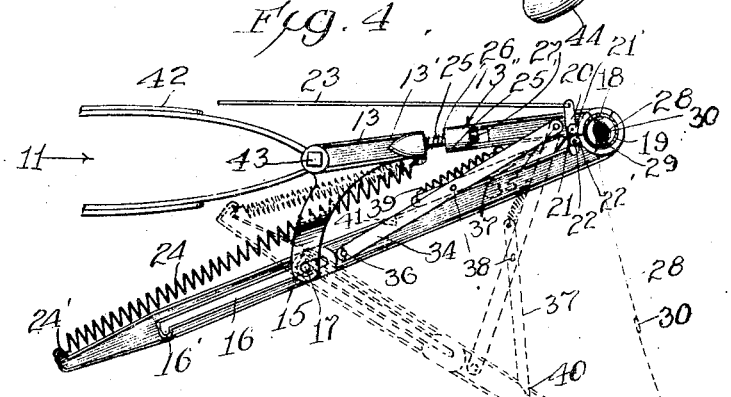
Witnesses:
H. C. C. Hule
M. A. Kiddie
Inventor
Harry T. Myers
By Linthicum, Belt & Fuller Attys H. T. MYERS.
COMBINED BUMPER AND FENDER.
APPLICATION FILED FEB. 21, 1910.
1,026,279.
Patented May 14, 1912
4 SHEETS—SHEET 3.
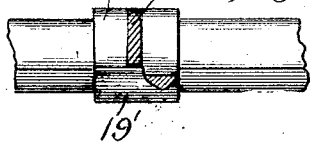
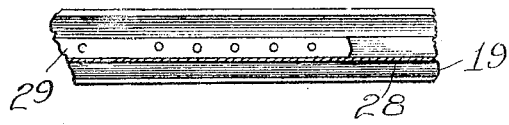
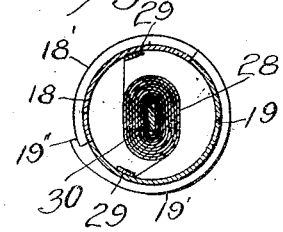
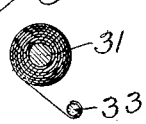
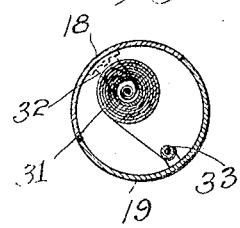
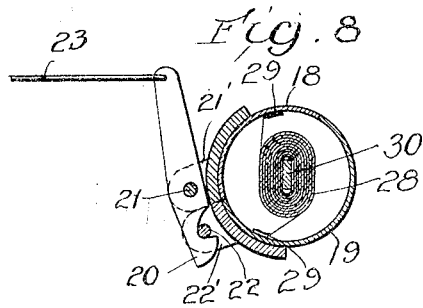
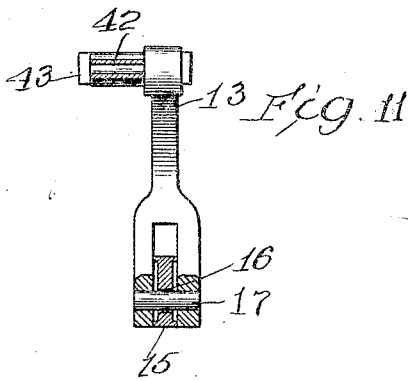
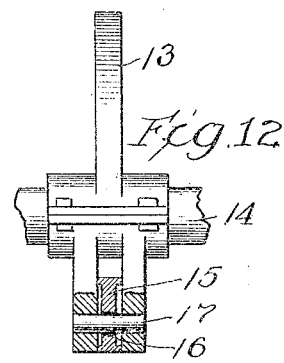
Witnesses
H. R. L. White
M. A. Kiddie
Inventor:
Harry T. Myers
By Linthicum, Bell + Fuller
Attys H. T. MYERS.
COMBINED BUMPER AND FENDER.
APPLICATION FILED FEB. 21, 1910.
1,026,279.
Patented May 14, 1912.
4 SHEETS—SHEET 4.
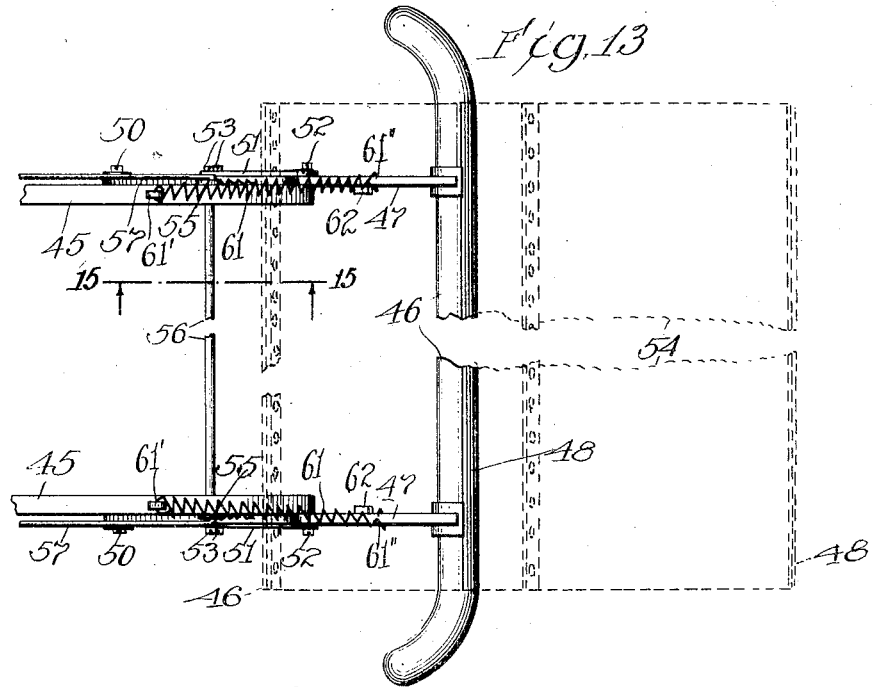
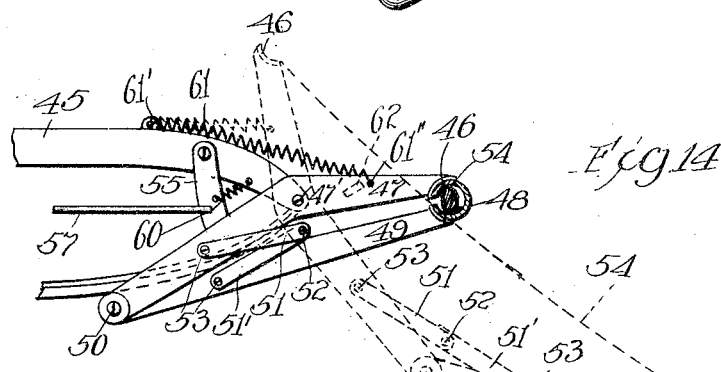
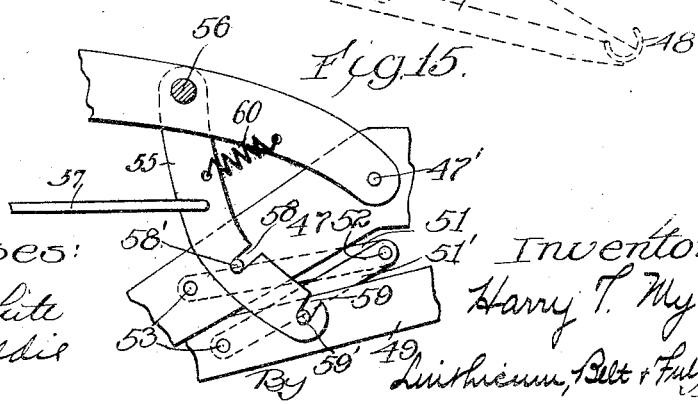
Witnesses:
Inventor: Harry T. Myers

UNITED STATES PATENT OFFICE.

HARRY T. MYERS, OF CHICAGO, ILLINOIS.

COMBINED BUMPER AND FENDER.

1,026,279.  Specification of Letters Patent.  Patented May 14, 1912.

Application filed February 21, 1910. Serial No. 545,207.

*To all whom it may concern:*

Be it known that I, HARRY T. MYERS, a citizen of the United States, residing at Chicago, in the county of Cook and State of Illinois, have invented new and useful Improvements in Combined Bumpers and Fenders, of which the following is a specification.

The object of this invention is to provide an attachment for vehicles which is adapted under normal conditions to operate as a bumper but which may be manipulated as occasion requires to act as a fender.

While my invention is particularly adapted for use on automobiles it may also be used on street cars and other vehicles.

Another object of the invention is to provide an apron normally wound or otherwise compactly arranged in closed position and means for quickly opening and spreading the apron to constitute a fender.

A further object of the invention is to normally conceal an apron in the bumper and provide for automatically opening the bumper and spreading the apron to form a fender.

The invention has other objects in view which will appear hereinafter in the description of the drawings, in which—

Figure 1 is a plan view of the invention applied to the front axle of an automobile and showing the apron opened in broken lines. Fig. 2 is a sectional view on the line 2—2 of Fig. 1. Fig. 3 is a plan view similar to Fig. 1 showing the invention applied to the front springs of an automobile. Fig. 4 is a sectional view on the line 4—4 of Fig. 3. Fig. 5 is a detail sectional view on the line 5—5 of Fig. 1. Fig. 6 is a detail view showing the interior of the bumper with the apron in section. Fig. 7 is a sectional view on the line 7—7 of Fig. 1. Fig. 8 is a sectional view on the line 8—8 of Fig. 1. Figs. 9 and 10 are sectional views showing an apron wound on a spring roller. Figs. 11 and 12 are detail views partly in section looking in the direction of the arrows 11 and 12 on Figs. 4 and 2, respectively. Fig. 13 is a plan view of the preferred embodiment of the invention, the apron being shown open in broken lines. Fig. 14 is a side elevation thereof. Fig. 15 is an enlarged fragmentary sectional view taken on the line 15—15 of Fig. 13.

In Figs. 1 to 4 of the drawings I have illustrated two constructions in each of which the attachment comprises a fixed and a relatively movable member but in the construction illustrated in Figs. 13 to 15, which I conceive to be the preferred construction, both members of the attachment are movable.

Referring first to Figs. 1 and 2, the invention comprises a pair of supporting arms 13 which are fastened in any suitable manner to the front axle 14 of a vehicle. Slide bars 15 are guided on the lower rear ends of the arms 13 and for this purpose are provided with longitudinal slots 16 to receive stud pins 17 on the arms. A sectional hollow bumper is supported on the forward ends of the supporting arms and the slide bars. The part 18 of the bumper is made fast to the supporting arms and the other part 19, which constitutes the movable part of the bumper, is made fast to the slide bars. The parts of the bumper may be fastened to the arms and the slide bars in any suitable manner, for example, the bumper may have a sectional collar for each set of the arms and slide bars, as shown more clearly in Figs. 5 and 7, one part 18′ of each collar being made fast to the supporting arm and to the stationary part 18 of the bumper, and the other part 19′ of each collar being made fast to the movable part 19 of the bumper. The part 19′ of the collar is preferably provided with a lip 19″ to overlap the rear edge of the part 18′ of the collar to insure proper registration of the two parts of the bumper and to prevent the lower part of the bumper from being thrust forward relative to the upper part. The bumper is preferably made in tubular form and circular or substantially circular in cross section and the two parts thereof are normally held in closed position by a latch lever 20 pivotally mounted at 21 on ears 21′ rigid with the stationary part 18 of the bumper and arranged to make locking engagement with a pin 22 on ears 22′ rigid with the movable part 19 of the bumper. An operating rod 23 is connected to the free end of the latch lever and is adapted to be operated from the vehicle in any suitable manner. Springs 24 are engaged at their rear ends 24′ to the slide bars and at their forward ends 24″ to the supporting arms and in the normal position of the parts these springs are stretched over the axle 14. The tension of the springs 24 is exerted to thrust the slide bars forward but this is prevented when the two parts of the bumper are locked together by reason of the overlapping lips 19" as heretofore explained. To permit of a yielding movement of the bumper in or about a horizontal plane I make the supporting arms 13 in two sections 13', 13", and provide one section, as 13', with bolts 25 to slide in hollow bosses 25' on the other section. A spring 26 is arranged on the bolt between the two sections of the arm and suitable means are provided at the outer end of the bolt to prevent disengagement of the sections, such as a pin 27. This yielding connection between the two sections of each supporting arm permits the bumper to yield as occasion requires in actual practice and the guide slots 16 in the slide bars are made of sufficient length to permit them to move rearwardly with the forward sections 13" of the supporting arms. The apron 28 may be made of canvas or any other suitable material and in any desired form. The apron is fastened at its upper edge to the stationary part 18 and at its lower edge to the movable part 19 of the bumper, in each instance to the inner side of the part and preferably by a clamping strip 29 which is fastened to the part by screws, or other suitable means, and secures the edge of the apron rigidly to the part (Fig. 6). The apron may be wound or folded or otherwise arranged in compact form to fit wholly within the tubular bumper and I have found it convenient to provide the apron midway between its upper and lower edges with a slat 30 fastened to the apron in any suitable manner so that it can be employed as a core on which to wrap the apron in the manner shown more clearly in Figs. 7 and 8. It will be observed that in this construction the apron is wrapped on the core 30 commencing at the middle of the apron so that in opening the apron it will unwind at both its upper and lower edges.

In Figs. 9 and 10 I have shown the apron wound on an ordinary spring curtain roller 31 suitably mounted in bearings 32 within the stationary upper part 18 of the bumper. In this construction the free edge of the curtain is fastened at 33 in any suitable manner to the movable part 19 of the bumper. When the movable part is dropped, as hereafter described, the apron will unwind from the roller 31, whereas in the construction shown in Figs. 7 and 8 the rolled part of the apron floats between the two parts of the bumper and unwinds from the center outward to both upper and lower edges.

Braces 34 are pivotally connected at their upper ends 35 to the supporting arms 13 near their forward ends, and at their lower ends 36 to the slide bars in front of the guide slots 16. When the slide bars and the movable part of the bumper, which constitutes the swing frame of the attachment, are swung downward, as shown in broken lines in Fig. 2, the braces 34 operate to hold this swing frame rigidly in its lowered position. Struts 37 are pivotally connected at 38 between their ends to the braces 34 and springs 39 are connected to the upper ends of the struts and to said braces. The lower ends 40 of the struts are pointed to engage notches 41 in the upper edges of the slide bars. When the attachment is in folded position, as shown in full lines in Fig. 2, the struts lie upon the upper edges of the slide bars with their pointed ends forwardly directed; as the swing frame drops to the position shown in broken lines in Fig. 2 the struts are swung on their pivots 38 by the springs 39 into position to engage the notches 41. These struts coöperate with the braces in making the swing frame rigid in its lowered position. The rear ends 16' of the guide slots 16 in the slide bars are offset to receive the pivot studs 17 when the swing frame is lowered, and this also adds to the rigidity of the swing frame because it prevents rearward movement of the slide bars when they are in lowered position.

In the construction of Figs. 1 and 2 hereinbefore described, the attachment is mounted rigidly on the front axle of an automobile. In Figs. 3 and 4 I have shown the attachment mounted at the outer ends of the front springs 42 of an automobile and secured thereto by bolts 43.

In practice the attachment, constructed as shown in Figs. 1 to 4, is set in closed position, with the springs 24 and 39 at tension, and locked in this position by the latch lever. The apron is then wrapped, folded or otherwise arranged and wholly concealed within the bumper where it is protected from injury and kept in serviceable condition. The attachment in folded position operates as a bumper and guards the automobile or other vehicle to which it is attached from injury. When the operator finds it necessary to avoid running over a person he pulls on the operating rod 23 to release the latch lever and then the springs 24 operate to thrust the swing frame forward and downward to form a fender, stretching the apron and rigidly holding it in position to pick up the person.

In the several constructions illustrated in the drawings the ends 44 of the bumper are curved rearwardly and downwardly and the movable part of the bumper extends only from the middle of the bumper to the curved ends, but the curved ends may be omitted if desired.

In the constructions thus far described the upper member of the attachment is fixed relative to the lower member, which latter is adapted to swing down in or about the manner described to stretch the apron. I prefer, however, to construct the attachment so that both members will swing in opposite directions to stretch the apron. Referring to Figs. 13, 14 and 15 the operative parts are mounted on arms 45 attached to the front springs in or about the manner indicated in Figs. 3 and 4. These parts may be mounted at the outer ends of the front axle in or about the manner indicated in Figs. 1 and 2, if desired. In the construction shown in Figs. 3, 14 and 15, the upper part 46 of the bumper is mounted on the ends of levers 47 constituting the upper frame and the lower part 48 of the bumper is mounted on the ends of levers 49 constituting the lower frame. These two frames are pivotally connected at 50. The levers 47 are pivotally mounted at 47′ on the arms 45. The levers 47 and 49 of each pair are connected by a folding stay which comprises two members 51, 51′, pivotally connected together at their adjacent ends 52 and pivotally connected to the levers at their outer ends 53 adjacent to the pivot 50. The bumper is provided with an apron 54 fastened at its ends to the parts of the bumper and adapted to be folded or otherwise arranged within the bumper when the latter is in closed position. To sustain the parts in closed position, as shown in full lines in Fig. 14, I provide latch levers 55 which are rigidly mounted on a cross rod 56 which is operated from the automobile or other vehicle in any suitable manner by an operating rod 57. The latch lever has slots 58 and 59 to receive the pins 58′ on levers 47 and the pins 59′ on levers 49. Springs 60 hold the levers in operative engagement with the pins. Springs 61 are fastened at 61′ to the arms 45 and at 61″ to the arms 47 to open the attachment when the latch levers are disengaged from the pins, and stops 62 on the levers 47 are arranged to engage the arms 45 to limit the opening movement of the attachment.

The invention, as embodied in the construction of Figs. 13–15, operates as a bumper in folded position and as a fender when the frames are opened to stretch the apron by manipulating the operating means in the manner heretofore described. In this construction, however, the levers operate to move both of the parts of the bumper, instead of the lower part only, and in so doing the two parts of the bumper are separated until the apron is stretched taut. When the latches 55 are released from engagement with the pins 58′ and 59′ the springs 61 swing the outer ends of the upper levers 47 upward and the inner or rear ends downward, and the folding stays which connect the levers 47 and 49 straighten out, the lower frame levers 49 falling forward and downward as clearly indicated in broken lines in Fig. 14.

My invention is simple in construction, light in weight and inexpensive to make and it can be readily applied to any automobile, street car, or other vehicle. It serves the double purpose of a bumper and a fender.

What I claim and desire to secure by Letters Patent is:

1. A combined bumper and fender comprising a two-part bumper, an apron normally held in compact form by the bumper, and means for opening the bumper and releasing the apron.

2. A combined bumper and fender comprising a two-part bumper, an apron normally arranged in compact form within the bumper, and means for opening the bumper and stretching the apron.

3. A combined bumper and fender comprising a two-part tubular bumper, an apron normally arranged in compact form in said bumper, and means for opening the bumper and stretching the apron.

4. A combined bumper and fender comprising a two-part bumper, an apron normally arranged in compact form in the bumper and attached to the parts thereof, means for holding the parts of the bumper together, and means for opening the apron when said holding means are released.

5. A combined bumper and fender comprising a two-part bumper, an apron having its upper and lower edges fastened to the parts of the bumper and normally arranged in compact form therein, and means for separating the parts of the bumper to stretch the apron.

6. A combined bumper and fender comprising a two-part bumper, an apron having its upper and lower edges fastened to said parts, and a core between the upper and lower edges of the apron on which the latter is adapted to be wound into compact form for housing within the bumper.

7. A combined bumper and fender comprising a two-part bumper, an apron having its upper and lower edges fastened to the parts of the bumper and normally arranged in compact form within the bumper, and means for moving the parts of the bumper in opposite directions to stretch the apron.

8. A combined bumper and fender comprising a two-part bumper, an apron having its upper and lower edges fastened to the parts of the bumper and normally arranged in compact form therein, means for locking the parts of the bumper together, and means for separating said parts.

9. A combined bumper and fender comprising a two-part bumper, an apron having its upper and lower edges fastened to the parts of the bumper and normally arranged in compact form therein, a locking member connected with one part, a locking lever connected with the other part to engage said locking member, and means for operating said lever to release it from engagement with the locking member.

10. A combined bumper and fender comprising a pair of swing frames, a two-part bumper mounted on said frames, an apron having its upper and lower edges fastened to the parts of the bumper and normally arranged in compact form therein, and means for swinging said frames to separate the parts of the bumper and thereby extend the apron.

11. A combined bumper and fender comprising a pair of supporting arms, a swing frame mounted on said arms, another swing frame pivotally connected to the first mentioned swing frame, a bumper made in two parts and said parts being mounted on said swing frames, an apron having its upper and lower edges fastened to the parts of the bumper and normally arranged in compact form therein, means for holding the frames in position with the bumper closed, means for releasing the frames, and means for swinging the frames to separate the parts of the bumper.

HARRY T. MYERS.

Witnesses:
 WM. O. BELT,
 M. ROBERTSON.